(12) United States Patent
Costello (10) Patent No.: US 8,474,404 B2
(45) Date of Patent: Jul. 2, 2013

(54) PET TOY WITH ADJUSTABLE TREAT DISPENSING LID

(75) Inventor: Chuck Costello, Louisville, CO (US)

(73) Assignee: The Kong Company, LLC, Golden, CO (US)

( * ) Notice: Subject to any disclaimer, the term of this patent is extended or adjusted under 35 U.S.C. 154(b) by 0 days.

(21) Appl. No.: 13/247,039

(22) Filed: Sep. 28, 2011

(65) Prior Publication Data

US 2012/0012068 A1 Jan. 19, 2012

Related U.S. Application Data

(63) Continuation-in-part of application No. 12/579,043, filed on Oct. 14, 2009.

(51) Int. Cl.
*A01K 5/00* (2006.01)
(52) U.S. Cl.
USPC ........................................ 119/51.01; 119/710
(58) Field of Classification Search
USPC ............ 119/51.01, 710, 711, 57.91; 446/475; 222/286, 522, 523
See application file for complete search history.

(56) References Cited

U.S. PATENT DOCUMENTS

| | | | |
|---|---|---|---|
| 848,136 A | 3/1907 | Smith | |
| 901,762 A | 10/1908 | Wetzel | |
| 1,006,182 A | 10/1911 | Cousin | |
| 1,022,112 A | 4/1912 | Smith | |
| 1,031,095 A | 7/1912 | Smith | |
| 1,534,964 A | 4/1925 | Kahnweiler | |
| 1,789,333 A * | 1/1931 | Da Costa | 473/571 |
| 2,086,631 A * | 7/1937 | Munro | 119/711 |
| 2,554,516 A | 5/1951 | Anthony | |
| 2,601,767 A | 7/1952 | Wall | |
| 2,606,691 A * | 8/1952 | Lindly | 222/142.2 |
| 2,665,519 A | 1/1954 | Burkes | |
| 2,790,582 A * | 4/1957 | Halpern | 222/481.5 |
| 2,792,161 A * | 5/1957 | Thomas | 222/522 |
| 2,942,379 A | 6/1960 | Oman et al. | |
| 3,305,145 A * | 2/1967 | Tebbutt | 222/522 |
| 3,830,202 A | 8/1974 | Garrison | |
| 3,847,305 A * | 11/1974 | Tobin | 222/166 |
| D256,958 S | 9/1980 | Markham | |

(Continued)

FOREIGN PATENT DOCUMENTS

| | | |
|---|---|---|
| GB | 2253329 | 9/1992 |
| JP | 2003-102872 | 4/2003 |
| WO | WO 95/35137 | 12/1995 |
| WO | WO 98/52424 | 11/1998 |

OTHER PUBLICATIONS

U.S. Appl. No. 29/398,255, filed Jul. 28, 2011, Costello et al.

(Continued)

*Primary Examiner* — Yvonne Abbott
(74) *Attorney, Agent, or Firm* — Sheridan Ross PC (57) ABSTRACT

A pet toy with an adjustable treat dispensing lid has a lid or top that is connected to a body of the pet toy, and a treat holding enclosure receives treats. The enclosure has an open area which communicates with a treat dispensing opening of the lid enabling treats to be selectively dispensed. The lid may be placed at selected positions with respect to the body thereby changing the size of the exposed treat dispensing opening to thereby selectively change the rate at which treats are dispensed.

17 Claims, 7 Drawing Sheets

U.S. PATENT DOCUMENTS

| | | | | |
|---|---|---|---|---|
| 4,223,636 | A * | 9/1980 | Dishong | 119/709 |
| 4,591,074 | A * | 5/1986 | Kennings | 222/153.01 |
| 4,756,530 | A * | 7/1988 | Karman | 273/113 |
| 4,784,288 | A * | 11/1988 | Jennings | 221/4 |
| 4,802,444 | A | 2/1989 | Markham et al. | |
| 4,907,537 | A | 3/1990 | Shirk | |
| D307,339 | S | 4/1990 | Markham et al. | |
| 4,971,203 | A * | 11/1990 | Weinstein | 206/536 |
| 5,141,129 | A * | 8/1992 | Jennings | 221/154 |
| 5,169,354 | A | 12/1992 | Norton et al. | |
| 5,191,856 | A | 3/1993 | Gordon | |
| RE34,352 | E | 8/1993 | Markham et al. | |
| D344,161 | S | 2/1994 | Markham | |
| 5,294,018 | A | 3/1994 | Boucher | |
| D348,412 | S | 7/1994 | Hazelton | |
| 5,379,922 | A * | 1/1995 | Paradoski | 222/153.06 |
| D355,733 | S | 2/1995 | O'Rourke et al. | |
| D373,859 | S | 9/1996 | Markham et al. | |
| 5,620,109 | A * | 4/1997 | Madden | 220/345.4 |
| 5,758,604 | A | 6/1998 | Jorgensen | |
| 5,813,366 | A | 9/1998 | Mauldin, Jr. | |
| 5,819,690 | A | 10/1998 | Brown | |
| 5,843,366 | A | 12/1998 | Shuert | |
| 5,865,146 | A | 2/1999 | Markham | |
| 5,865,147 | A | 2/1999 | Rubin | |
| D407,868 | S | 4/1999 | Axelrod | |
| 5,904,118 | A | 5/1999 | Markham | |
| 5,965,182 | A | 10/1999 | Lindgren | |
| 6,073,581 | A | 6/2000 | Wang | |
| 6,098,571 | A | 8/2000 | Axelrod et al. | |
| 6,109,210 | A | 8/2000 | Nasser | |
| 6,112,698 | A * | 9/2000 | Zelinger | 119/61.54 |
| 6,129,053 | A | 10/2000 | Markham et al. | |
| 6,158,390 | A * | 12/2000 | Holtier et al. | 119/707 |
| 6,158,391 | A * | 12/2000 | Simonetti | 119/707 |
| 6,167,841 | B1 * | 1/2001 | Ho | 119/61.54 |
| 6,217,408 | B1 * | 4/2001 | Willinger | 446/396 |
| 6,237,538 | B1 | 5/2001 | Tsengas | |
| 6,439,166 | B1 | 8/2002 | Markham | |
| D462,487 | S | 9/2002 | Axelrod | |
| 6,526,912 | B1 * | 3/2003 | Ottoson | 119/51.01 |
| 6,736,294 | B2 * | 5/2004 | Smith | 222/463 |
| D505,233 | S | 5/2005 | Viola | |
| 6,941,895 | B2 * | 9/2005 | St. Pierre | 119/711 |
| D515,253 | S | 2/2006 | Viola | |
| 7,082,895 | B2 | 8/2006 | Barney et al. | |
| 7,146,934 | B1 * | 12/2006 | Staley | 119/709 |
| D544,653 | S | 6/2007 | Bryne | |
| D544,655 | S | 6/2007 | Hass | |
| D546,507 | S | 7/2007 | Byrne | |
| 7,246,574 | B2 * | 7/2007 | Renforth | 119/711 |
| D564,715 | S | 3/2008 | Lamstein | |
| D564,716 | S | 3/2008 | Lamstein | |
| 7,389,748 | B2 | 6/2008 | Shatoff et al. | |
| RE40,430 | E | 7/2008 | Markham | |
| 7,426,903 | B2 * | 9/2008 | Simon | 119/707 |
| D579,157 | S | 10/2008 | Edwards | |
| 7,451,724 | B2 | 11/2008 | Barney et al. | |
| D589,659 | S | 3/2009 | Semler | |
| 7,536,978 | B2 * | 5/2009 | Washington et al. | 119/707 |
| RE40,872 | E | 8/2009 | Markham | |
| 7,574,978 | B1 * | 8/2009 | Peterson | 119/709 |
| D603,111 | S | 10/2009 | Hass | |
| 7,600,488 | B2 * | 10/2009 | Mann | 119/710 |
| 7,681,763 | B2 * | 3/2010 | McGuyer | 222/499 |
| D620,207 | S | 7/2010 | Byrne | |
| 7,878,151 | B2 | 2/2011 | Tsengas | |
| 7,905,491 | B2 * | 3/2011 | Gray | 273/450 |
| D642,342 | S | 7/2011 | Shatoff et al. | |
| 2002/0073934 | A1 | 6/2002 | Barney et al. | |
| 2005/0045115 | A1 * | 3/2005 | Mann | 119/711 |
| 2007/0283900 | A1 | 12/2007 | Jager | |
| 2008/0121190 | A1 | 5/2008 | Moulton | |
| 2008/0141948 | A1 | 6/2008 | Renforth et al. | |
| 2009/0000565 | A1 | 1/2009 | Bryce | |
| 2009/0038559 | A1 | 2/2009 | Markham | |
| 2009/0038560 | A1 | 2/2009 | Markham | |
| 2011/0083608 | A1 | 4/2011 | Markham | |
| 2011/0139815 | A1 * | 6/2011 | Benson | 222/1 |

OTHER PUBLICATIONS

"Bobble Bone Treat Dispensing Dog Toy" Qquirky, available in store Feb. 3, 2011, found at http://www.quirky.com/products/83-Bobble-Bone-Treat-Dispensing-Dog-Toy, 6 pages.

Jess "Introducing . . . Bobble Bone", a quirky blog, Feb. 2, 2011, 6 pages, found at http://aquirkyblog.com/2011/02/introducing-bobble-bone/.

International Search Report for International (PCT) Application No. PCT/US10/51269, mailed Dec. 14, 2010.

Written Opinion for International (PCT) Application No. PCT/US10/51269, mailed Dec. 14, 2010.

International Preliminary Report on Patentability for International (PCT) Patent Application No. PCT/US2010/051269, mailed Apr. 26, 2012 7 pages.

* cited by examiner

PET TOY WITH ADJUSTABLE TREAT DISPENSING LID

CROSS REFERENCE TO RELATED APPLICATIONS

This application is a continuation in part of co-pending patent application Ser. No. 12/579,043, filed on Oct. 14, 2009, entitled Treat Dispenser For Animals and Method, the entire disclosure of which is incorporated herein by reference.

FIELD OF THE INVENTION

The present invention relates to pet toys that dispense food or treats, and particularly, to a pet toy having an adjustable treat dispensing lid that enables the dispensing of treats/food in a controlled way to thereby selectively dispense different sized and shaped treats/food and at varying rates.

BACKGROUND OF THE INVENTION

Interactive pet toys are becoming increasing popular. There are many benefits attributed to a pet toy that may stimulate an animal. For example, the physical and mental health of a pet may be improved with interactive pet toys that cause a pet to be productively engaged with the pet toy.

Pet toys that dispense treats are commercially available in many configurations. By increasing the intensity and length of time an animal is occupied, the animal may be less prone to engage in negative behaviors. For example, pet toys that dispense edible treats have proven to remediate conditions such as separation anxiety experienced by some pets One example of a pet toy incorporating a dispensing feature is the invention disclosed in U.S. Pat. No. 6,526,912. This reference discloses a dispenser having a base portion and an upper portion defined by at least one wall enclosing a container cavity. An opening is formed in the upper portion to gain access to a cavity within the container. A weight is fixed to the base of the dispenser, and provides a means for returning the dispenser to an upright position after the dispenser has been tipped. The dispenser can be moved on a surface in an oscillating and sliding motion by the animal to cause treats to be dispensed from the opening.

While treat dispensing pet toys are generally known, there are still a number of deficiencies with prior art treat dispensing toys. One deficiency is the inability to easily load or remove treats from the pet toy. Other disadvantages with the prior art is the inability to effectively dispense treats of different sizes and shapes, and to dispense at different controlled rates. A further problem with many existing treat dispensing pet toys is that many are difficult to clean, and the residue from pet treats over time can create unpleasant odors and become a general health hazard due to bacterial colonization.

SUMMARY OF THE INVENTION

In accordance with the present invention, a treat or food dispensing device and method are provided that enable a pet owner to control the dispensing of various types of treat/food from the device to include treats/food of different sizes and shapes, and to control the rate of dispense. The word "treat" used hereinafter is intended to include all animal food stuffs that can be consumed by an animal to include traditional treats and food of widely varying types. Treats may take a number of different forms such as uniformly sized nuggets, or the treats can be irregularly sized and shaped.

According to a preferred embodiment of a device of the present invention, the dispenser has a body, base, and an adjustable lid that connects to an upper portion of the body. The body is preferably hollow and has one or more containers disposed in the hollow body which receive treats as loaded therein by pet owner. The adjustable lid has one or more openings that are used to dispense the treats. The lid is adjustable in its relative position with respect to an upper surface or edge of the body that enables the pet owner to adjust the size of the treat dispensing openings. In the preferred embodiment, the treat dispensing lid has an extension that frictionally engages the interior wall or surface of the body, and which enables the treat dispensing lid to be precisely positioned in order to optimize the size of the treat dispensing opening. The size and number of openings will determine the rate at which treats can be dispensed. The treat dispensing lid may be positioned at one or more locked positions with respect to the body thereby setting the size of the opening for dispensing the treats. These locked positions are accommodated in the preferred embodiment by one or more detents that are formed on the lid extension and which selectively communicate with grooves formed on the portion of the body which receive the detents.

Within the hollow body of the pet toy, one or more treat holding enclosures or containers are disposed, and attach to the interior wall of the body. In one preferred embodiment, the container walls are spaced from the interior surfaces of the body, and the container has its upper edge joined to the abutting portion of the interior wall of the body.

In accordance with the method of the present invention, the lid may be completely removed in order to charge the pet toy with the desired treats. Alternatively, the lid may be lifted away from the body and the treats may be charged by placing them through the one or more treat dispensing openings. The pet owner then may adjust the size of the treat dispensing openings and provide the pet toy to the animal. As the animal interacts with the pet toy, the pet toy will be tipped, rolled, and otherwise moved in different positions which result in treats being dispensed from the openings. The pet owner may decide to prevent the pet toy from dispensing treats and therefore, the pet owner may simply move the lid to a closed position in which the treat dispensing openings are not exposed.

Other features and advantages of the present invention will become apparent from review of the following detailed description taken in conjunction with the drawings.

DETAILED DESCRIPTION OF THE PREFERRED EMBODIMENTS

Figure 1:
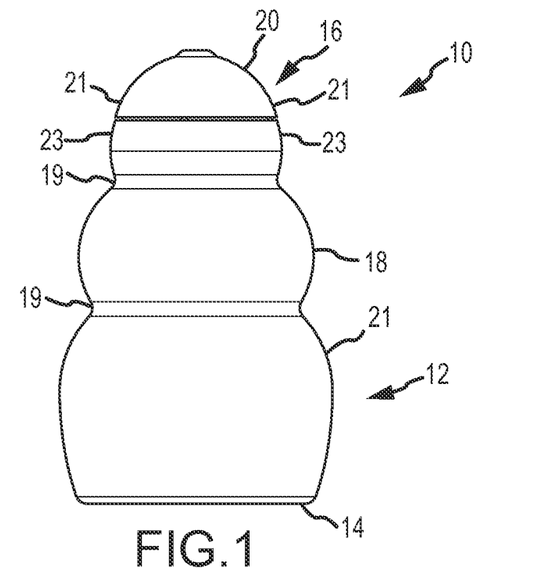
FIG. 1 illustrates an elevation view of the pet toy with the lid in a closed position.

FIG. 1 illustrates the dispenser device 10 in a preferred embodiment. The dispenser 10 includes a body 12, a base 14, and an adjustable lid 16. The body 12 in the first preferred embodiment is characterized by a tiered structure having various tiered sections separated by grooves or recessed portions 19. In FIG. 1, the lid 16 is in the closed or shut position such that there is a smooth transition when comparing the bottom portion 21 of the exposed surface 20 of the lid and the upper portion 23 of the body.

Figure 2:
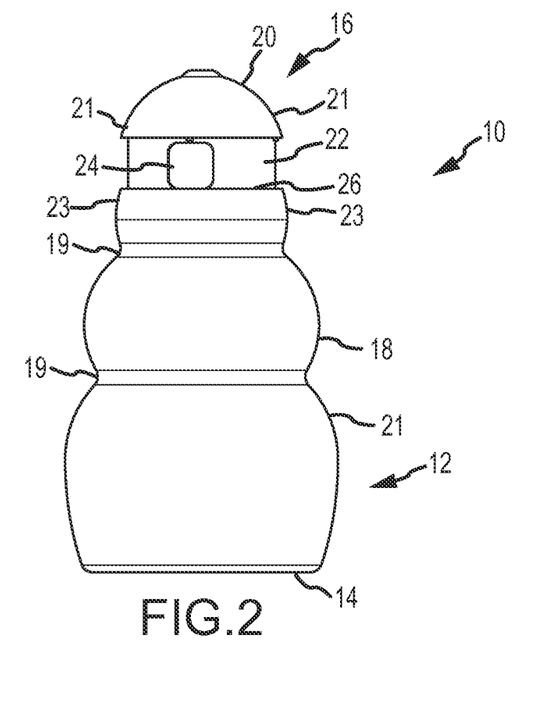
FIG. 2 is an elevation view of the pet toy showing the lid in an open position thereby exposing the treat dispensing opening.

Referring to FIG. 2, the lid 16 is shown in the open or raised position, thereby exposing the treat dispensing opening 24. The opening 24 is formed within an adjustable extension 22 of the lid that slides up or down with respect to the body 12, and can be placed in one or more selective locked positions as discussed in more detail below.

The body 12 as viewed in the FIGS. 1 and 2 may be conceptually viewed as having an upper section or tier comprising the lid 16 and the upper portion 23 of the body, a middle section or tier 18 having a greater diameter or size as compared to the upper section, and another lower section 21 having a greater diameter or size as compared to the middle section. The base 14 may have a substantially flat surface that enables the pet toy to stand in an upright position.

Figure 3:
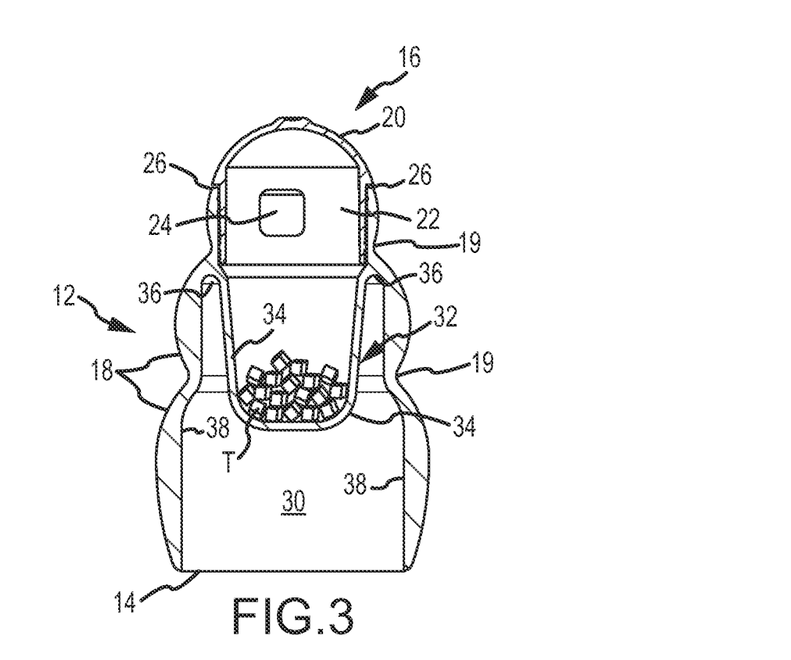
FIG. 3 is a vertical section of the pet toy of FIG. 1, showing the construction of the pet toy including the arrangement of the adjustable extension of the lid and the treat holding enclosure disposed within an interior cavity of the pet toy.

Referring to FIG. 3, interior details of the pet toy are illustrated. FIG. 3 illustrates the lid 16 in the closed position such that the adjustable extension 22 is disposed within the upper section of the body. In this position, the treat dispensing opening 24 is not exposed thereby preventing treats T from being dispensed. As shown in FIG. 3, the body 12 may be generally hollow thereby defining an interior cavity or open space 30.

FIG. 3 also illustrates a treat holding enclosure or container 32 which holds the treats T. The enclosure/container 32 is defined by container walls 34, which in FIG. 3 are cup shaped continuous walls that connect along interior rim 36 disposed on the interior wall 38 of the body. Thus, if viewed from a top plan view, the treat holding enclosure 32 would be continuously joined to the interior wall 38 of the body thereby forming a sealed enclosure communicating with the lid 16.

Figure 4:
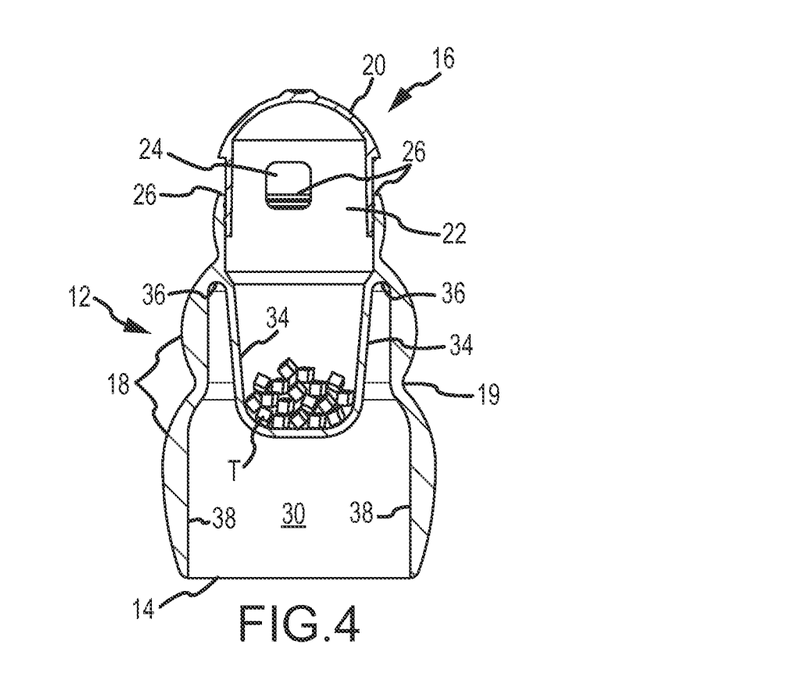
FIG. 4 is another vertical section illustrating the pet toy of FIG. 3 in which the lid is in the open position.

Referring to FIG. 4, the lid 16 is moved to the open position, thereby exposing the treat dispensing opening 24. The upper edge 26 of the body 12 limits the lower edge of the treat dispensing opening 24 that is exposed. The opening 24 can be square shaped as shown, or any other shape that would enable a pet owner to control the size of the opening to therefore increase or decrease the rate of dispense of the pet treats. The degree of friction between the extension 22 and the interior wall 38 can be adjusted to require a reasonable amount of force, but not excessive, to maintain the lid 16 at a desired spaced position from the upper edge 26 of the body thereby holding the pet toy in the desired setting to control the rate at which treats are dispensed.

Figure 5:
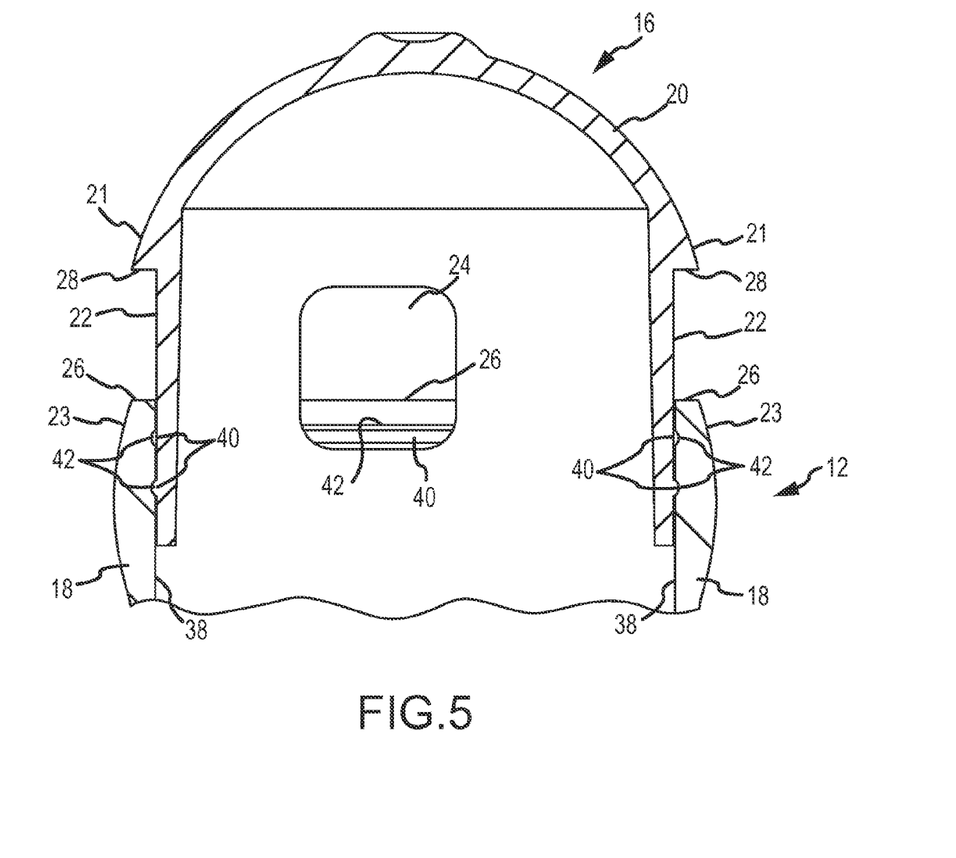
FIG. 5 is a greatly enlarged fragmentary vertical section of FIG. 4 illustrating how the treat dispensing lid may be selectively positioned in one or more locked positions by use of detents and corresponding detent receiving grooves.

Referring to FIG. 5, additional details are shown of the lid 16 and the manner in which it engages the interior surface or wall 38 of the body 12. As shown, the adjustable extension 22 may have a plurality of detents 40 formed on the outer surface thereof, and which selectively mate with corresponding detent receiving grooves 42 formed on the interior wall or surface 38. In FIG. 5, two detents 40 are illustrated, along with two corresponding detent receiving grooves 42. The lid in this example may be selectively positioned in an upward or downward motion to selectively change the size of the treat dispensing opening 24 that is exposed and to better maintain the lid in a locked position. However, depending on the amount of frictional force generated between the adjusting of the lid with the body, this frictional force alone may allow a user to incrementally move and hold the lid in the desired open position.

As also shown in FIG. 5, the exposed surface 20 of the lid 16 includes a mating flange 28 that contacts the upper edge 26 of the body when the lid is placed in a closed position, thereby resulting in a continuous curved and uninterrupted surface between the lid 16 and the upper portion 23 of the body.

Figure 6:
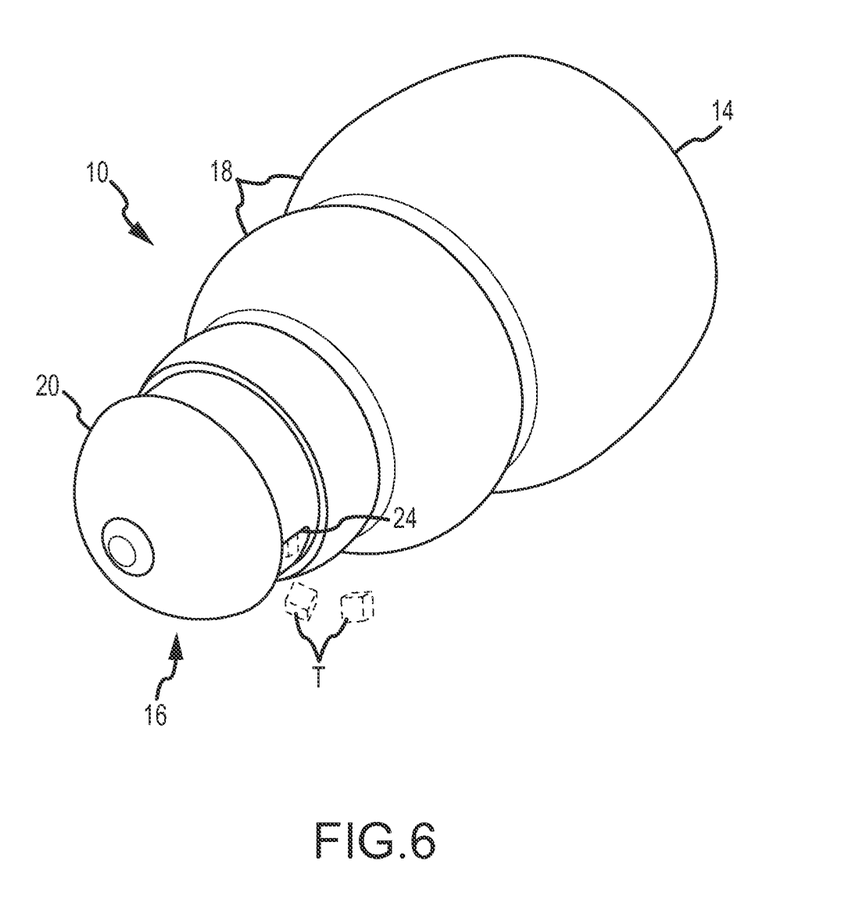
FIG. 6 is a perspective view of the pet toy illustrating it in a tipped position with the treats being dispensed.

Referring to FIG. 6, the pet toy 10 is illustrated in which the pet toy is tipped, and one or more treats T have been dispensed.

Figure 7:
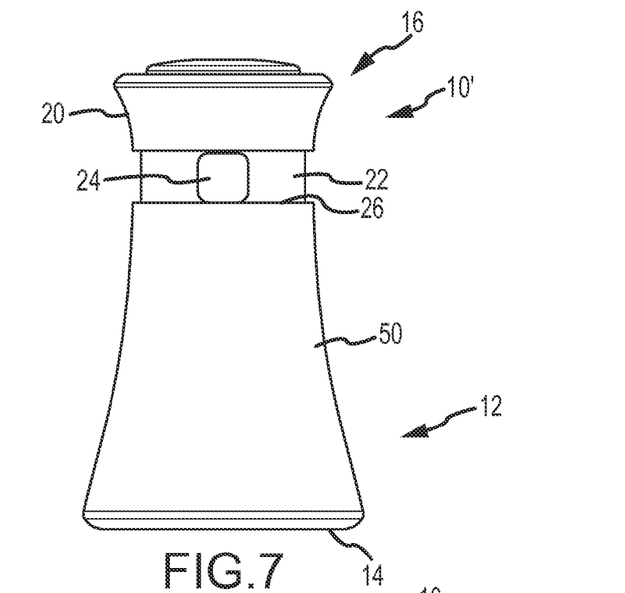
FIG. 7 illustrates the pet toy in a second preferred embodiment in an elevation view with the treat dispensing lid in the open position.

FIG. 7 illustrates the second preferred embodiment. The same reference numbers used for this second preferred embodiment correspond to the same structural elements described above with respect to the first embodiment. The pet toy 10' of FIG. 7 differs in that it has a different shaped body 50 that can be described as having a smooth, curved continuous shape in which the upper and lower portions of the body have a greater diameter as compared to the middle portion of the body 50.

Figure 8:
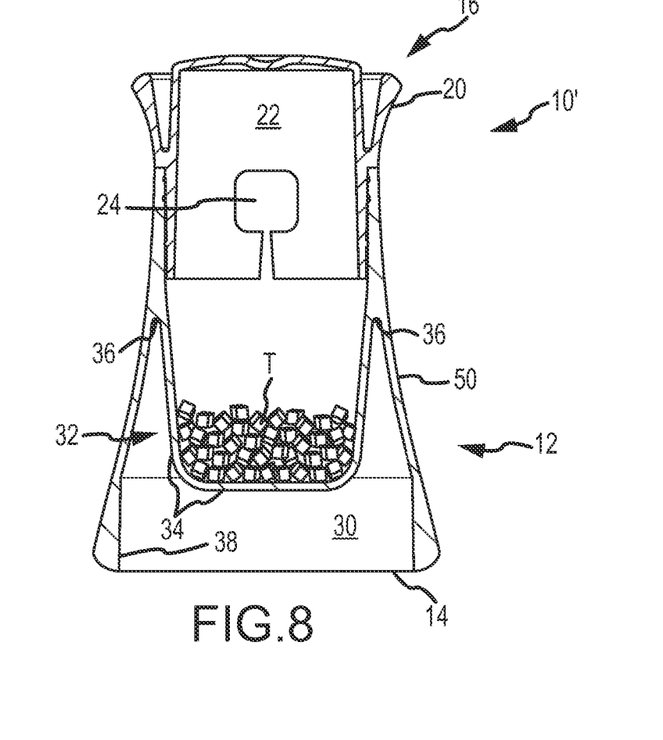
FIG. 8 is a vertical section of the pet toy of FIG. 7 and illustrating the treat dispensing lid in a closed position.

Referring to FIG. 8, the pet toy of FIG. 7 is illustrated in which the treat dispensing lid 16 is in the lower or closed position. Like the first embodiment, the second embodiment also shows a treat holding enclosure or container 32 which holds treats T.

Figure 9:
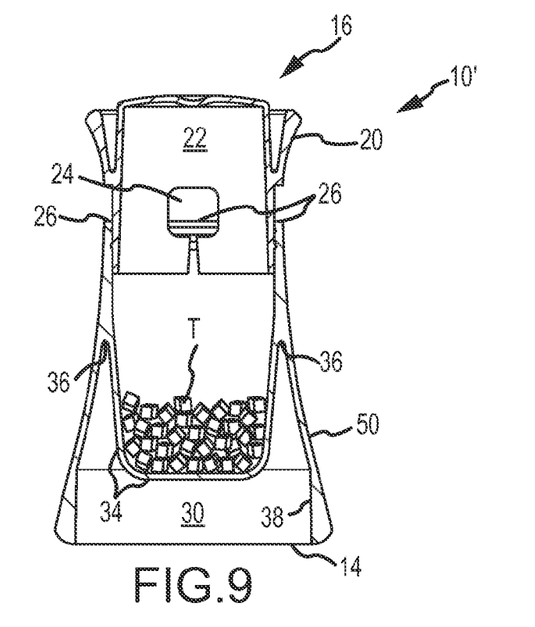
FIG. 9 is another vertical section of the pet toy illustrating the pet toy in a first open position.

FIG. 9 illustrates the pet toy of FIG. 7 with the lid 16 in a first raised or open position, in which the detents are positioned such as shown in FIG. 5. In this FIG. note the upper edge 26 of the body limits the size of the treat dispensing opening 24.

Figure 10:
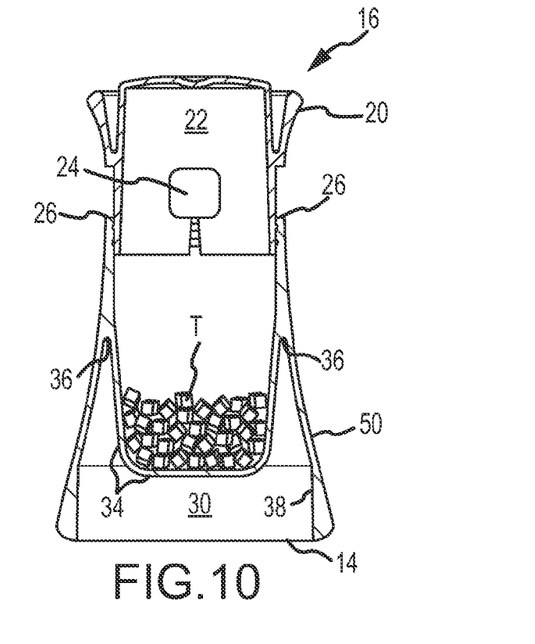
FIG. 10 is another vertical section of the pet toy of FIG. 7 illustrating the treat dispensing lid in a second open position.

Referring to FIG. 10, the lid 16 is shown in a second raised or open position, such that the lid 16 is in a higher elevated position as compared to FIG. 9, thereby enlarging the treat dispensing opening 24 such that the upper edge 26 does not interfere with the size of the opening 24.

As mentioned, the adjustable extension 22 makes frictional contact with the interior wall or surface 38 of the body. As discussed in connection with FIG. 5, detents and detent receiving grooves can be used to lock the position of the lid. Alternatively, the detents and grooves may be eliminated in favor of simply a friction fit between the lid and body such that the lid can be placed at an infinite number of positions with respect to the body and thereby resulting in an infinite number of positions for the size of the opening 24. One advantage of providing the detents and grooves is that an owner may hear a clicking sound which registers with the owner as corresponding to a sized opening 24 for selectively dispensing a known sized treat and at a selected rate of dispense.

Figure 11:
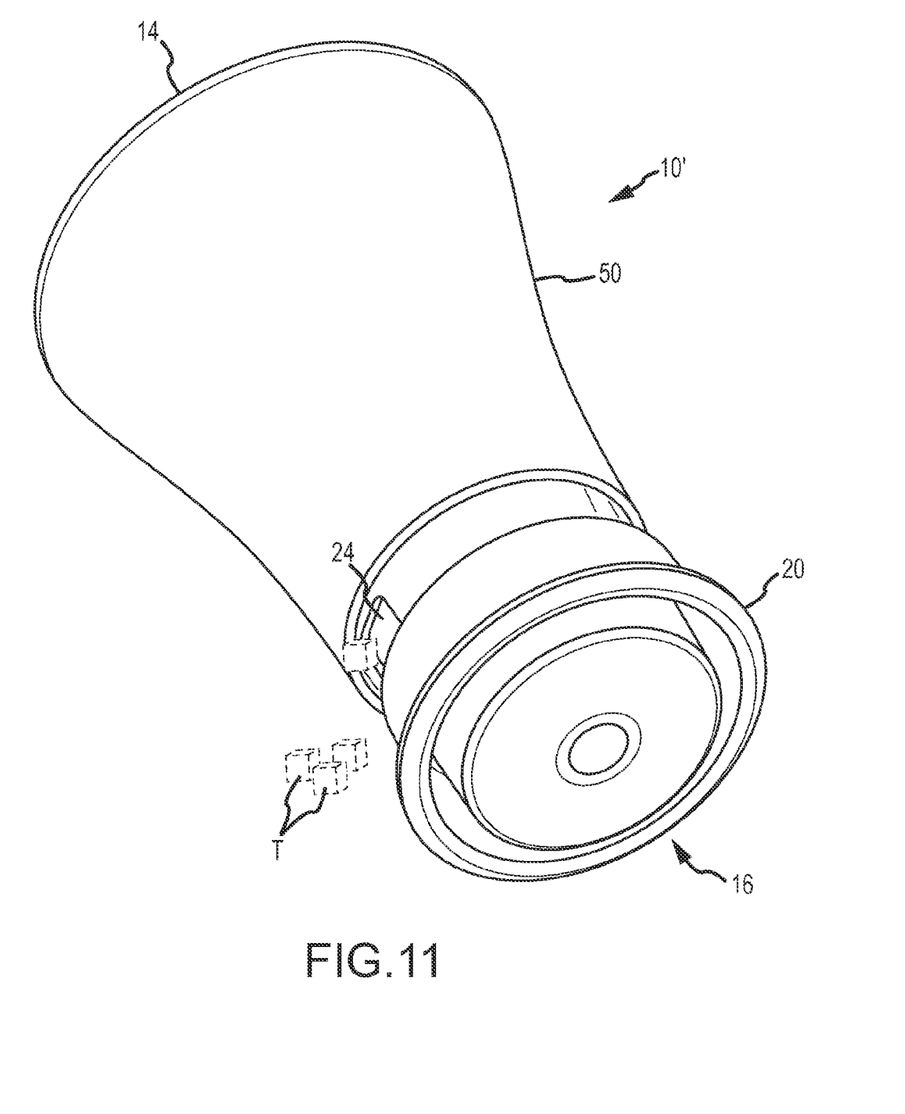
FIG. 11 is a perspective view of the pet toy of FIG. 7 illustrating the pet toy tipped and dispensing treats.

Referring to FIG. 11, the pet toy 10' is illustrated in which the pet toy is tipped, and one or more treats T have been dispensed.

According to a method of the present invention, a user charges the pet toy with the desired type of treat, according to a known size and shape. The lid 16 may be completely removed for adding treats within the treat holding enclosure 32, or the user may simply lift the lid to the open position and place treats through the opening 24. The user then sets a desired size opening 24 to selectively dispense the treats at a desired rate, based upon the owner's perceived level of interaction by the pet. For particularly aggressive interaction between the animal with the pet toy, this will presumably result in a relatively high rate of dispense of treats that the owner can limit by minimizing the size of the dispense opening 24. On the other hand, if there is a less aggressive interaction, the owner may wish to increase the rate of dispense by raising the lid 16 thereby increasing the size of the dispense opening 24. If the owner wishes for the animal to interact with the pet toy but not receive treats, the owner has the option of simply closing the lid. The odor of the treats within the pet toy alone may induce adequate interaction with the animal.

Although only one treat dispensing opening 24 is illustrated in the preferred embodiments, it shall be understood more than one opening 24 could be disposed around the circumference of the adjustable extension 22 which thereby provides yet further options in the rate at which treats are dispensed.

From the foregoing, a number of advantages are provided for the pet toy. A simple yet robust construction is provided enabling a pet owner to easily charge or remove treats from the pet toy. The adjustable lid enables a user to dispense different sized and shaped treats, and at different rates.

Although the present invention has been disclosed in one or more preferred embodiments, it shall be understood that various other changes and modifications can be made to the invention in accordance with the scope of the claims appended hereto.

The invention claimed is:

1. A dispenser for dispensing treats, said dispenser comprising:
   a body having an interior cavity;
   a lid removably connected to the body, said lid having an adjustable extension making frictional contact with an interior surface of said body, and said lid extension having at least one treat dispensing opening; and
   a treat holding enclosure secured within said cavity, said enclosure having a container wall spaced from said body and said enclosure having an upper edge connected to said body along said interior surface of said body thereby forming a container within said body.

2. A dispenser as claimed in claim 1, wherein:
   said body has at least two sections of differing sizes.

3. A dispenser, as claimed in claim 1, wherein:
   said body has a continuous curved shape.

4. A dispenser, as claimed in claim 1, wherein:
   said body has an upper edge that delimits the size of the treat dispensing opening when the lid is moved from a closed position to an open position.

5. A dispenser, as claimed in claim 1, wherein:
   said lid further includes at least one detent formed on an exterior surface of said adjustable extension, and said body includes at least one detent receiving groove formed on an interior surface thereof that is adapted to receive said detent when said detent is placed at a selected position.

6. A dispenser, as claimed in claim 1, wherein:
   said adjustable lid extension frictionally engages said interior surface of said body enabling said lid to be incrementally open or closed, thereby providing an infinite number of positions of said lid with respect to said body, and thereby selectively changing a size of the treat dispensing opening.

7. A dispenser, as claimed in claim 1, wherein:
   said treat dispensing opening includes a plurality of treat dispensing openings.

8. A dispenser, as claimed in claim 1, further including:
   at least one treat placed in said treat holding enclosure.

9. A method of dispensing treats from a device when contacted by an animal playing with the device, said method comprising:
   providing a body having an interior cavity and a lid removably connected to the body, said lid having an adjustable extension making frictional contact with an interior surface of said body, and said lid having at least one treat dispensing opening;
   charging the pet toy with selected treats;
   selectively adjusting the lid to dispense the treats; and
   causing an animal to play with the device wherein the device is moved from a first normal upright position to a tipped position, thereby causing treats to be dispensed through the at least one treat dispensing opening.

10. A method as claimed in claim 9, further comprising:
    adjusting the position of the lid with respect to the body, thereby changing the size of the treat dispensing opening in order to adjust the rate at which the treats are dispensed.

11. A method as claimed in claim 9, wherein:
    said lid is moved to a closed position to prevent treats from being dispensed.

12. A dispenser for dispensing treats, said dispenser comprising:
    a body having an interior cavity;
    a treat holding enclosure disposed within said interior cavity of said body, and said treat holding enclosure having a container wall spaced from said body, and an upper edge connected to said body thereby isolating the interior cavity from an area defining an opening of the treat holding enclosure; and
    a lid having an adjustable extension slidably engaged with an interior surface of said body, said adjustable extension having at least one treat dispensing opening formed therein.

13. A dispenser as claimed in claim 12, wherein:
    said lid further includes an exposed surface such that when said lid is closed with respect to said body, said lid forms a continuous curved surface in combination with an upper portion of said body.

14. A dispenser, as claimed in claim 12, wherein:
    said lid further includes at least one detent formed on an exterior surface of said adjustable extension, and said body includes at least one detent receiving groove formed on an interior surface thereof that is adapted to receive said detent when said detent is placed at a selected position.

15. A dispenser, as claimed in claim 12, wherein:
    said adjustable lid extension frictionally engages said interior surface of said body enabling said lid to be incrementally opened or closed, thereby providing an infinite number of positions of said lid with respect to said body, and thereby selectively changing a size of the treat dispensing opening.

16. A dispenser, as claimed in claim 12, wherein:
    said treat dispensing opening includes a plurality of treat dispensing openings.

17. A dispenser, as claimed in claim 12, further including:
    at least one treat placed in said treat holding enclosure.

* * * * *